United States Patent [19]

Kato et al.

[11] Patent Number: 4,717,756

[45] Date of Patent: Jan. 5, 1988

[54] PROCESS FOR PREPARING METHACRYLATE POLYMER

[75] Inventors: Yasuyuki Kato; Masahiro Yuyama; Masahiko Moritani, all of Niihama; Yukio Yasunori, Toyonaka, all of Japan

[73] Assignee: Sumitomo Chemical Company, Limited, Osaka, Japan

[21] Appl. No.: 46,983

[22] PCT Filed: Aug. 4, 1986

[86] PCT No.: PCT/JP86/00400

§ 371 Date: Apr. 6, 1987

§ 102(e) Date: Apr. 6, 1987

[87] PCT Pub. No.: WO87/00842

PCT Pub. Date: Feb. 12, 1987

[30] Foreign Application Priority Data

Aug. 6, 1985 [JP] Japan .................................. 60-173915

[51] Int. Cl.$^4$ .............................................. C08F 4/50
[52] U.S. Cl. ....................................... 526/146; 526/135; 526/147
[58] Field of Search .......................... 526/135, 146, 147

[56] References Cited

U.S. PATENT DOCUMENTS

| | | | |
|---|---|---|---|
| 3,985,718 | 10/1976 | Chabert | 526/146 |
| 4,009,150 | 2/1977 | Norling | 526/146 |
| 4,081,308 | 3/1978 | Skoultchi | 526/146 |
| 4,174,311 | 11/1979 | Nakano et al. | 526/217 |
| 4,259,462 | 3/1981 | Nakano et al. | 525/263 |
| 4,415,417 | 11/1983 | Bush | 526/146 |

FOREIGN PATENT DOCUMENTS 1566993 5/1980 United Kingdom.

*Primary Examiner*—Paul R. Michl
*Attorney, Agent, or Firm*—Birch, Stewart, Kolasch & Birch

[57] ABSTRACT

A polymerization can be carried out rapidly by polymerizing a methacrylate ester or a mixture of unsaturated monomers comprising the methacrylate ester as a main component in the presence of (1) a hydroperoxide polymerization initiator, (2) a reductant containing sulfur in a molecule, (3) a hydrogen halogenide salt of amine or a quarternary halogenide and (4) a copper-containing compound.

16 Claims, No Drawings

PROCESS FOR PREPARING METHACRYLATE POLYMER

FIELD OF THE INVENTION

The present invention relates to a process for preparing a methacrylate polymer. More particularly, the present invention relates to a process for preparing a methacrylate polymer which comprises rapidly polymerizing a methacrylate ester or an unsaturated monomer mixture comprising the methacrylate ester as a main component in the presence of a specific polymerization initiator and a specific accelerator.

BACKGROUND OF THE INVENTION

As described in DE-AS No. 1 146 254, when polymerization of an unsaturated monomer such as a methacrylate ester is initiated at room temperature and rapidly proceeded by the use of a multi-component system of a polymerization initiator and an accelerator (hereinafter referred to as "initiator system"), a process comprising an independent addition and mixing of each component of the initiator system with the monomer has a problem in that the components are hardly mixed homogeneously in a short time and the polymerization reaction cannot be sufficiently effected. In addition, a process comprising premixing each component of the initiator system and adding the mixture to the monomer has a problem such that, depending on a combination of the components, a reaction among the premixed components occurs so that the components are degraded in a short time.

The above DE-AS describes an initiator system and a manner for adding it which do not suffer from the above problems and are used in a process in which polymerization of the unsaturated monomer such as the methacrylate ester is initiated at room temperature and conducted comparatively rapidly.

The initiator system proposed in the above DE-AS is one comprising an alkyl acyl peroxide, a specific compound containing a halogen atom, a sulfur-containing compound, and as an optional component a heavy metal containing compound. The addition of the initiator system to the monomer is carried out by adding a solution of the alkyl acyl peroxide and the specific compound containing the halogen atom in an inert solvent to a system in which the monomer, the sulfur-containing compound, and optionally the heavy metal containing compound are premixed.

OBJECTS OF THE INVENTION

One object of the present invention is to provide a new process which can result in a rapid polymerization of a methacrylate ester and the like.

It is convenient to use a procedure in which the monomer is divided into two parts, and the polymerization initiator and a part of the accelerator are added to one part of the monomer and the rest of the accelerator is added to the other part of the monomer to prepare two solutions having good storageability, which are mixed when polymerization is to be effected so as to achieve the above object in a process for proceeding the rapid polymerization of the methacrylate ester and the like.

Another object of the present invention is to provide a process for polymerization using an initiator system which can be used in such a mixing procedure.

DETAILED DESCRIPTION OF THE INVENTION

One aspect of the present invention resides in a process for preparing a methacrylate polymer comprising polymerizing a methacrylate ester or a mixture of unsaturated monomers comprising the methacrylate ester as a main component in the presence of (1) a hydroperoxide polymerization initiator, (2) a reductant containing sulfur in a molecule, (3) a hydrogen halogenide salt of amine or a quarternary ammonium halogenide, and (4) a copper-containing compound.

The methacrylate ester used in the present invention is a methacrylate ester of a mono- or poly-hydric alcohol containing an alkyl group having 1 to 25 carbon atoms. As the alcohol, exemplified are methanol, ethanol, isopropanol, tert-butanol, sec-butanol, phenol, cyclohexanol, 4-methylcyclohexanol, 1-cyclohexylethanol, 1-adamantanol, 2-adamantanol, 3-methyl-1-adamantanol, 3,5-dimethyl-1-adamantanol, 3-ethyladamantanol, 3-methyl-5-ethyl-1-adamantanol, 3,5,8-triethyl-1-adamantanol, 3,5-dimethyl-8-ethyl-1-adamantanol, octahydro-4,7-menthanoinden-5-ol, octahydro-4,7-menthanoinden-1-ylmethanol, p-menthanol-8, p-menthanol-2,3-hydroxy-2,6,6-trimethylbicyclo[3.1.1]heptane, 3,7,7-trimethyl-4-hydroxy-bicyclo[4.1.0]heptane, borneol, isoborneol, 2-methylcamphanol, fenchylalcohol, l-menthanol, 2,2,5-trimethylcyclohexanol, ethylene glycol, diethylene glycol, tetraethylene glycol, nonaethylene glycol, tetradecaethylene glycol, Bisphenol-A, trimethylolpropane, pentaerythritol and the like.

The methacrylate ester can be used alone, and it can be used as a mixture of two or more methacrylate esters or as a mixture of a certain methacrylate ester and at least one other copolymerizable unsaturated monomer to improve characteristics of the polymer produced or increase polymerization activity during the preparation of the polymer.

As the copolymerizable unsaturated monomer, exemplified are acrylate esters (e.g., methyl acrylate, ethyl acrylate, butyl acrylate, propyl acrylate, phenyl acrylate, cyclohexyl acrylate and so on); aromatic vinyl compounds (e.g., styrene, p-methylstyrene, α-methyl styrene and so on); acrylic acid, methacrylic acid, maleic anhydride, acrylonitrile and so on.

The copolymerizable unsaturated monomer is used in an amount of not more than 50 parts by weight, preferably not more than 30 parts by weight per 100 parts by weight of the methacrylate ester. When the amount of other monomer is more than the above, the inherent properties of the methacrylate polymer, for example, gloss, weather resistance, hardness, and the like are deteriorated.

Although the methacrylate ester or its mixture with the copolymerizable monomer can be polymerized as such, it is preferred to polymerize a mixture of the monomer and its polymer, namely a so-called "syrup", due to the improvement of polymerization activity and easy handling. A polymer content in the syrup is usually from 3 to 40% by weight. When the polymer content in the syrup is larger than 40% by weight, the syrup has too large a viscosity so that the ability to handle of the syrup is reduced. The syrup may be prepared by a per se conventional method. For example, the polymerization of the monomer is initiated by the addition of a polymerization initiator and terminated when a conversion reaches a certain level, or an adequate amount of the polymer is dissolved in the monomer.

As the hydroperoxide polymerization initiator, exemplified are tert-butyl hydroperoxide, cumene hydroperoxide, diisopropylbenzene hydroperoxide, p-methane hydroperoxide, 2,5-dimethylhexane-2,5-dihydroperoxide, 1,1,3,3-tetramethyl butyl hydroperoxide and so on. These polymerization initiators exhibit a particularly high polymerization activity, and a premixture of the polymerization initiator, a part of the accelerator and a part of the monomer has a good storageability. The hydroperoxide polymerization initiator is used in an amount of 0.1 to 5 parts by weight per 100 parts by weight of the methacrylate ester (which includes other unsaturated monomers when they are used and polymers in the syrup when the syrup is used). When the amount of the initiator is less than the above lower limit, the polymerization does not completely proceed. It is not desirable to use the initiator in an amount larger than the above upper limit, since control of the polymerization is difficult and the weather and heat resistances of the produced polymer are decreased.

The reductant containing sulfur in the molecule to be used according to the present invention forms a redox system together with the hydroperoxide polymerization initiator and includes di- or tetra-valent sulfuric compounds such as sulfinate esters, thioureas and mercaptans. Specific examples are methyl p-toluenesulfinate, ethyl p-toluenesulfinate, tetramethylthiourea, dibutylthiourea, laurylmercaptan, tert-dodecylmercaptan, octylmercaptan, butylmercaptan, 2-ethylhexyl thioglycolate, pentaerythritol tetrathioglycolate, glycol dimethylmercaptoacetate, 2-mercaptoethanol and its esters, $\beta$-mercaptopropionic acid and its esters and the like.

The sulfur-containing reductant is used in an amount of 0.1 to 5 parts by weight per 100 parts by weight of the methacrylate ester (which includes other unsaturated monomers when they are used and polymers in the syrup when the syrup is used). When the amount of the reductant is less than 0.1 parts by weight, a polymerization rate is decreased, and when it is more than 5 parts by weight, the produced polymer is colored or its strength is deteriorated.

As the hydrogen halogenide salt of amine or the quarternary ammonium halogenide used according to the present invention, exemplified are hydrogen chloride salts or hydrogen bromide salts of amine (e.g., n-amylamine, n-hexylamine, n-octylamine, n-decylamine, laurylamine, palmitylamine, dibutylamine, tributylamine, N,N-dimethylbenzylamine, N,N-dimethyl-p-toluidine, phenethyldibutylamine, N,N,N',N'-tetramethylhexamethylenediamine, N,N,N',N'-tetramethylpropylenediamine, N,N-diethylbenzylamine, N,N-dibutylbenzylamine and phenethyldiethylamine); and tetramethylammonium chloride, benzyltrimethylammonium chloride, benzyltriethylammonium chloride, benzyltributylammonium chloride, trioctylmethylammonium chloride, $\beta$-phenethyldibutylethoxycarbonylmethylammonium chloride and so on.

These compounds may be used in an amount of 0.005 to 1 parts by weight, preferably 0.01 to 0.5 parts by weight per 100 parts by weight of the methacrylate ester (which includes other unsaturated monomers when these are used, and polymers in the syrup when the syrup is used). When their amount is less than 0.005 parts by weight or larger than 1 parts by weight, the polymerization rate is decreased. These compounds may be used as such when they are soluble in the monomer, or in the form of a solution in a solvent such as isopropanol, dimethylphthalate or diethylene glycol when they are insoluble in the monomer.

The copper-containing compound used according to the present invention includes copper salts of an organic acid, copper-containing complexes and the like which are soluble in the monomer, for example, copper naphthenate and copper acetylacetonate. The copper-containing compound is used in an amount of 0.005 to 10 ppm, preferably 0.1 to 5 ppm of copper per weight of the methacrylate ester (which includes other unsaturated monomers when they are used, and polymers in the syrup when the syrup is used). When the amount of the copper-containing compound is less than 0.005 ppm, the polymerization rate is low and polymerization time varies. When it is more than 10 ppm, the polymerization initiator is deactivated to inhibit the polymerization.

Although the polymerization according to the present invention may be carried out in any polymerization mode, preferably it is carried out by bulk polymerization. A liquid composition comprising a solution of the hydroperoxide polymerization initiator, the reductant containing sulfur in the molecule and the hydrogen halogenide salt of amine or the quarternary ammonium halogenide in the methacrylate ester or the unsaturated monomer mixture comprising the methacrylate ester as the main component is poured in a mold and polymerized to produce a molded article. Although each component may be added independently in the mold and polymerized, in this case, homogeneous mixing is difficult. Therefore, preferably, the monomer is divided into two parts, and to one of them, the polymerization initiator and the hydrogen halogenide salt of amine or the quarternary ammonium halogenide are added, and to the other of them, the reductant containing sulfur in the molecule and the copper-containing compound are added to prepare the solutions separately. Then the solutions are mixed together just before polymerization.

Although the process according to the present invention may be carried out at room temperature, preferably it is carried out at a temperature not lower than 50° C. to accelerate the polymerization. The monomer and the initiator system may be poured into the mold and the polymerization may be carried out by heating the mold to a temperature not lower than 50° C. Alternatively, the temperature of the mold may be raised to a predetermined temperature not lower than 50° C., and the monomer and the initiator system may be mixed and poured in the heated mold to carry out the polymerization.

The process according to the present invention is useful for producing any molded article of the methacrylate polymer.

Namely, by the process according to the present invention in which the polymerization is carried out in the mold, molded articles of various shapes can be made by changing the mold. Particularly, the process according to the present invention is suitable for producing optical parts since the polymer has significantly less internal strain. As the optical parts, exemplified are conventional lenses, Fresnel lenses, optical recording disc media, prisms and mirrors. Among them, the process is particularly suitable for producing the Fresnel lenses which are required to have a precise shape, since the precise image of the mold can be transferred to the produced polymer according to the present invention. Because a large size article also can be molded easily by the process according to the present invention, the present invention is suitable for producing automobile parts such as a plate for a front window, a sun roof, a side window and rear window, a sign board, a water tank panel and a bathtub.

According to the present invention, the methacrylate ester or the unsaturated monomer comprising the methacrylate ester as the main component can be polymerized rapidly to give a polymer having a good appearance without coloring, foaming and the like. In addition, according to the present invention, a manner of addition which is convenient for homogeneously mixing the initiator system with the monomer can be employed.

The initiator system used in the process according to the present invention can provide a premixture with good storageability comprising a part of its components and the monomer.

EXAMPLES

The present invention will be illustrated by the following examples which do not limit the present invention.

EXAMPLES 1-5 AND COMPARATIVE EXAMPLES 1-6

Preparation of Raw Syrup of Methyl Methacrylate

To a 10 l closed stainless steel vessel, methyl methacrylate polymer (SUMIPEX (trade mark) B MH manufactured by Sumitomo Chemical) (1 kg) and methyl methacrylate monomer (4 kg) were added and mixed at 60° C. for 5 hours to prepare a raw syrup having a polymer content of 20% and a viscosity of one poise.

Preparation of Syrup A

In the raw syrup (50 g), a predetermined amount of polymerization initiator as shown in Table 1 and an 8% by weight solution of dibutylamine hydrogen chloride in diethyleneglycol (1.05 g) were dissolved to prepare Syrup A.

Preparation of Syrup B

In the raw syrup (50 g), laurylmercaptan (0.5 g) and a 1% by weight solution of copper naphthenate (Cu content, 10%) in methyl methacrylate (0.05 g) were dissolved to prepare Syrup B.

Polymerization

Immediately after Syrup A and Syrup B were mixed, a mixture was poured into a mold (150×150×3 mm) and immersed in a hot water bath kept at 70° C. to polymerize the mixture. Time required for completing polymerization and an amount of the residual monomers in polymer are shown in Table 1. From these results, it is understood that when the hydroperoxide polymerization initiators are used, the polymerization activity is higher and the polymerization time is shorter than when other peroxide polymerization initiators are used.

TABLE 1

| | Polymerization initiator | | | Time for completing polymerization (min.) | Amount of residual monomer (%) |
|---|---|---|---|---|---|
| | Compound | Concentration (%) | Amount (g)(*1) | | |
| Example No. | | | | | |
| 1 | Cumene hydroperoxide | 80 | 0.92 | 3.0 | 1.8 |
| 2 | Diisopropylbenzene hydroperoxide | 50 | 1.9 | 3.5 | 1.9 |
| 3 | 1,1,3,3-Tetramethyl butyl hydroperoxide | 95 | 0.74 | 3.0 | 2.0 |
| 4 | t-Butyl hydroperoxide | 70 | 0.62 | 4.0 | 1.6 |
| 5 | p-Menthane hydroperoxide | 50 | 1.7 | 3.0 | 1.8 |
| Comp. | | | | | |
| 1 | Azobisisobutyronitrile | 100 | 0.81 | 30 | 8.0 |
| 2 | Lauroyl peroxide | 98 | 2.0 | 25 | 7.5 |
| 3 | Di-tert-butyl peroxide | 97 | 0.73 | 360≦ | — |
| 4 | Methyl ethyl ketone peroxide | 55 | 0.77 | 70 | 9.5 |
| 5 | tert-Butyl peroxy isobutyrate | 75 | 1.0 | 3.0 | 2.0 |
| 6 | Bis(4-tert-butyl cyclohexyl) peroxy dicarbonate | 95 | 2.0 | 5.0 | 22 |

Note:
(*1)An amount of each compound corresponded to 0.0053 mole.

Syrup A of Example 1 and Syrup A of Comparative Example 5 were stored at 25° C. for 1 day. The syrup of Example 1 exhibited no change, while the syrup of Comparative Example 5 polymerized to cure. It is understood that the syrup of Example 1 had better storageability than that of Comparative Example 5.

EXAMPLE 6

| | |
|---|---|
| Raw syrup of methyl methacrylate of Example 1 | 100 g |
| Cumene hydroperoxide | 0.7 g |
| Dibutylamine hydrogen chloride (8% solution in diethylene glycol) | 0.8 g |
| Methyl p-toluenesulfinate | 0.8 g |
| Copper naphthenate (Cu content, 10%) | 0.0005 g |

Immediately after the above components were mixed for one minute, the mixture was poured in a mold (150×150×3 mm) and immersed in a hot water bath kept at 80° C. to polymerize the mixture. Time required for completing the polymerization was 4 minutes, and an amount of the residual monomers in the resulting polymer was 1.8%. The polymer had good appearance but no coloring, foaming and the like.

EXAMPLES 7 TO 9

To the same raw syrup of the methyl methacrylate as used in Example 1 (100 g), cumene hydroperoxide, hydrochloric acid salt of trioctylamine, 2-ethyl hexyl thioglycolate and a 1% solution of copper naphthenate (Cu content, 10%) in methyl methacrylate in amounts shown in Table 2 were added. After mixing them for one minute, the mixture was poured in a mold (150×150×3 mm) and polymerized at 85° C.

Results are shown in Table 2.

ide to one part, and the reductant containing sulfur in the molecule and the copper-containing compound to the other to prepare solutions separately, and then mixing them together when polymerizing.

TABLE 2

| Example No. | Cumene hydroperoxide (g) | Hydrochloric acid salt of trioctylamine (g) | 2-Ethyl hexyl thioglycolate (g) | Copper naphthenate solution (g) | Time for completing polymerization (min.) | Appearance of polymer |
|---|---|---|---|---|---|---|
| 7 | 3 | 0.9 | 3 | 0.8 | 8 | Good |
| 8 | 1 | 0.008 | 1 | 0.05 | 4 | Good |
| 9 | 0.3 | 0.05 | 0.3 | 0.05 | 4 | Good |

What is claimed is:

1. A process for preparing a methacrylate polymer comprising polymerizing a methacrylate ester or a mixture of unsaturated monomers comprising the methacrylate ester as a main component in the presence of (1) a hydroperoxide polymerization initiator, (2) a reductant containing sulfur in a molecule, (3) a hydrogen halogenide salt of amine or a quarternary ammonium halogenide and (4) a copper-containing compound.

2. The process according to claim 1, wherein the methacrylate ester alone is polymerized.

3. The process according to claim 1, wherein two or more methacrylate esters are polymerized.

4. The process according to claim 1, wherein a mixture of the methacrylate ester and at least one other copolymerizable unsaturated monomer is polymerized.

5. The process according to claim 4, wherein not more than 50 parts by weight of the copolymerizable unsaturated monomer per 100 parts by weight of the methacrylate ester are polymerized.

6. The process according to claim 1, wherein the methacrylate ester is an ester of methacrylic acid with mono- or poly-hydric alcohol containing an alkyl group having 1 to 25 carbon atoms.

7. The process according to claim 1, wherein the methacrylate ester or the mixture of unsaturated monomers comprising the methacrylate ester as the main component is polymerized in the form of a mixture with its polymer.

8. The process according to claim 7, wherein a polymer content in the mixture of the monomer and the polymer is 3 to 40% by weight.

9. The process according to claim 1, which further comprises dividing the monomer in two parts, adding the polymerization initiator and the hydrogen halogenide salt of amine or the quarternary ammonium halogenide to one part, and the reductant containing sulfur in the molecule and the copper-containing compound to the other to prepare solutions separately, and then mixing them together when polymerizing.

10. The process according to claim 1, wherein the polymerization is carried out by bulk polymerization.

11. The process according to claim 4, wherein the copolymerized unsaturated monomer is a member selected from the group consisting of acrylate esters, aromatic vinyl compounds, acrylic acid, methyacrylic acid, maleic anhydride, and acrylonitrile.

12. The process according to claim 1, wherein the hydroperoxide polymerization initiator is selected from the group consisting of tert-butyl hydroperoxide, cumene hydroperoxide diisopropylbenzene hydroperoxide, p-methane hydroperoxide, 2,5-dimethylhexane-2,5-dihydroperoxide, and 1,1,3,3-tetramethyl butyl hydroperoxide.

13. The process according to claim 1, wherein the reductant containing sulfur in the molecule is a member selected from the group consisting of sulfinate esters, thioureas, and mercaptans.

14. The process according to claim 1, wherein the hydrogen halide salt is a member selected from the group consisting of hydrogen chloride salts of amine, hydrogen bromide salts of amine, tetramethylammonium chloride, benzyltrimethylammonium chloride, benzyltriethylammonium chloride, benzyltributylammonium chloride, trioctylmethylammonium chloride, and β-phenethyldibutylethoxycarbonylmethylammonium chloride.

15. The process according to claim 1, wherein the copper-containing compound is a member selected from the group consisting of copper naphthenate and copper acetylacetonate.

16. The process according to claim 1, wherein polymerization is conducted at a temperature of not less than 50° C.

* * * * *